(12) United States Patent
Dorgeuille et al.

(10) Patent No.: US 7,340,176 B2
(45) Date of Patent: Mar. 4, 2008

(54) METROPOLITAN AREA TYPE OPTICAL TELECOMMUNICATIONS NETWORK COMPRISING A RING TYPE CORE

(75) Inventors: Francois Dorgeuille, Paris (FR); Ludovic Noirie, Nozay (FR); Claude Artigue, Bourg la Reine (FR); Amaury Jourdan, Sevres (FR)

(73) Assignee: ALCATEL, Paris (FR)

( * ) Notice: Subject to any disclaimer, the term of this patent is extended or adjusted under 35 U.S.C. 154(b) by 553 days.

(21) Appl. No.: 10/391,641

(22) Filed: Mar. 20, 2003

(65) Prior Publication Data

US 2003/0180048 A1    Sep. 25, 2003

(30) Foreign Application Priority Data

Mar. 21, 2002  (FR) ................... 02 03 550

(51) Int. Cl.
*H04J 14/02* (2006.01)
(52) U.S. Cl. ....................................... 398/83
(58) Field of Classification Search ............... 398/59, 398/82, 83–85
See application file for complete search history.

(56) References Cited

U.S. PATENT DOCUMENTS

| | | | | |
|---|---|---|---|---|
| 5,452,115 | A | * | 9/1995 | Tomioka ................. 398/75 |
| 5,771,111 | A | * | 6/1998 | Domon et al. ........... 398/76 |
| 6,084,694 | A | | 7/2000 | Milton et al. |
| 6,587,239 | B1 | * | 7/2003 | Hung ...................... 398/79 |
| 2001/0017722 | A1 | * | 8/2001 | Takachio et al. ......... 359/124 |
| 2002/0191250 | A1 | * | 12/2002 | Graves et al. ............ 359/128 |
| 2003/0099475 | A1 | * | 5/2003 | Nemoto et al. .......... 398/83 |
| 2003/0154427 | A1 | * | 8/2003 | Hermann et al. ......... 714/31 |

FOREIGN PATENT DOCUMENTS

| | | |
|---|---|---|
| DE | 199 36 421 A1 | 2/2000 |
| EP | 0 763 909 A2 | 3/1997 |
| FR | 2 756 442 A1 | 5/1998 |
| FR | 2 782 589 A1 | 2/2000 |

OTHER PUBLICATIONS

D. Lecrosnier et al, "Opportunities for WDM Technologies in Access Network: an Overview from Eurescom P614" Proceedings of the European Conference on Networks and Optical Communications 1999, NOC'99. Broadband Access and Technology, Amsterdam, IOS Press, NL, vol. Part 1, 1999, pp. 134-140, XP000829376.

(Continued)

*Primary Examiner*—Shi K. Li
(74) *Attorney, Agent, or Firm*—Sughrue Mion, PLLC

(57) ABSTRACT

An optical telecommunications network (1000), of metropolitan area type, having a ring type core (10), and secondary rings (41, 42; 43, 44). In each sending access node (11), transmitters (111) for sending information-carrying optical signals use a wavelength belonging to a group of wavelengths dedicated to the secondary ring (41, 42) to which this sending access node (11) is connected. In each destination access node (21), receivers (212) are capable of receiving all the wavelengths used by sending nodes (11) of the network. Communication nodes (1, 2) comprise all-optical devices (100, 101, 10; 201, 20) for inserting, into the core fiber (10), optical signals sent by a sending access node connected to the communication nodes. Optical couplers (31, 32), for taking from the core fiber (10) a so-called representative signal formed of a fraction of the power of each information-carrying signal, are respectively coupled to the receivers of the destination nodes.

9 Claims, 1 Drawing Sheet

OTHER PUBLICATIONS

A. F. Elrefaie et al, "Fiber-Amplifier Cascades with Gain Equalization in Multiwavelength Unidirectional Inter-Office Ring Networks", IEEE Photonics Technology Letters, IEEE, Inc., NY US, vol. 5, No. 9, Sep. 1, 1993, pp. 1026-1028 XP000414170.

S. Johansson, "Transport Network Involving a Reconfigurable WDM Network—A European Demonstration" Journal of Lightwave Technology, IEEE, NY, US—vol. 14, No. 6, Jun. 1, 1996 pp. 1341-1348 XP000598537.

* cited by examiner

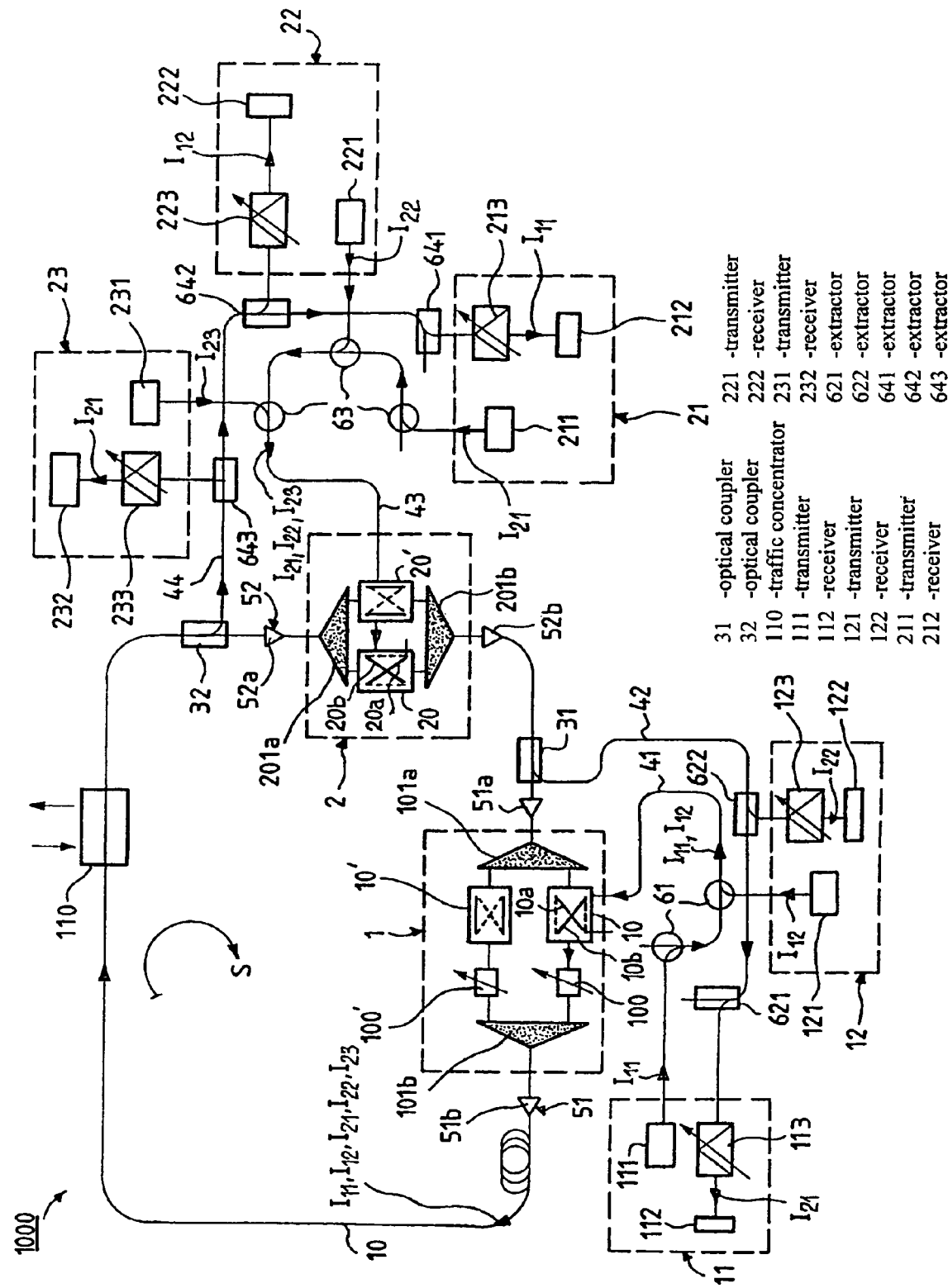

METROPOLITAN AREA TYPE OPTICAL TELECOMMUNICATIONS NETWORK COMPRISING A RING TYPE CORE

BACKGROUND OF THE INVENTION

The present invention relates to the field of optical telecommunications networks and describes more particularly an optical telecommunications network, of metropolitan area type, comprising a ring core.

In a known manner, networks such as certain metropolitan area networks covering fairly large geographical areas and allowing the interconnection of local networks for example situated at less than 100 km from one another have a ring type architecture.

The document entitled "A scalable transparent waveband-based optical metropolitan network", Jean-Paul FAURE et al., ECOC'2001, 30 Sep. 2001-4 Oct. 2001, 'Postdeadline Paper' A.1.10, Proceedings Vol. 6, discloses a metropolitan area optical telecommunications network comprising a ring core formed from an optical fibre for the transport of optical signals in which a traffic concentrator and main communication nodes are inserted. Each main communication node connects the metropolitan area network to a local network, the latter having a plurality of so-called access nodes connected to stations.

The basic function of the traffic concentrator consists of distributing, inside the metropolitan area network, modulated and wavelength-multiplexed optical signals originating from another network referred to as a backbone, and transmitting such signals to this backbone.

Each main communication node comprises a Waveband Optical Add/Drop Multiplexer. This multiplexer is capable of diverting part of the traffic from the core (selection of one or more wavebands) to a secondary ring, on which access nodes are inserted. Each access node is connected to local networks. This multiplexer is also capable of inserting traffic into the core fibre, in the direction of the concentrator (addition of one or more wavebands); whilst allowing all the wavebands of the multiplexed signals circulating in the core to pass through.

In the following text, the traffic between two metropolitan area networks connected to one and the same backbone will be referred to as "inter-network traffic". The traffic inside one and the same metropolitan area network, that is to say the traffic of information sent by an access node and intended for another access node connected to one and the same secondary ring or to another secondary ring of the same metropolitan area network, will be referred to as "intra-network traffic". Until now, this traffic has been considered negligible, and its management is therefore not optimised. In fact, in order to provide correct transmission of information between two access nodes of the same metropolitan area network, it is necessary to process all the traffic (intra-network traffic and inter-network traffic) within the concentrator inserted in the core fibre. This necessitates in particular: a step of demultiplexing all the optical signals circulating in the core fibre; then a step of electronic conversion and processing of all the demultiplexed signals; in order to arrive at the selection of the signals to be remultiplexed intended for the access nodes and not for the backbone.

The document FR 2 756 442 describes another example metropolitan area optical telecommunications network comprising a ring core formed from an optical fibre in which a traffic concentrator and main communication nodes are inserted. This traffic concentrator consists of an Electronic Add/Drop Multiplexer (abbreviated to EADM) which has the drawbacks mentioned above, due to the electronic conversion and processing of all the demultiplexed signals.

SUMMARY OF THE INVENTION

The object of the present invention is to develop a metropolitan area type network capable of managing the intra-network traffic simply and inexpensively.

To that end, the present invention proposes an optical telecommunications network, of metropolitan area type, comprising:

a ring type core comprising at least one optical fibre for the transport, in a given direction of propagation, of information-carrying optical signals;

secondary rings, each secondary ring being connected to the core by signal insertion means and signal extraction means, these means being inserted in the core fibre;

at least one first so-called sending access node, connected to the core via a secondary ring and insertion means, this sending access node comprising means for sending information-carrying optical signals;

at least one second so-called destination access node, connected to the core via a secondary ring and extraction means, this destination access node comprising means for receiving information-carrying optical signals;

Characterised in that:

in each sending access node, the means for sending information-carrying optical signals use a wavelength belonging to a group of wavelengths dedicated to the secondary ring to which this sending access node is connected;

in each destination access node, the receiving means are capable of receiving all the wavelengths used by sending nodes of the network;

the insertion means comprise all-optical means for inserting, into the core fibre, optical signals sent by a sending access node connected to these insertion means;

and the extraction means comprise optical couplers for taking from the core fibre a so-called representative signal formed of a fraction of the power of each information-carrying signal, these couplers being respectively coupled to said receiving means, of the destination nodes.

In the metropolitan area network thus characterised, management of the intra-network traffic is decoupled from that of the inter-network traffic which makes it possible to avoid the electronic processing of the prior art which is only necessary for managing the inter-network traffic. This is because the insertion and extraction means of this network allow any access node of this metropolitan area network to communicate transparently with any other access node of the same metropolitan area network. Such a metropolitan area network is therefore transparent for the transmission of intra-network optical signals. This facilitates, for example, transmission of information between two distant access nodes, connected to the core via separate secondary rings, or transmission between two near access nodes, connected to one and the same secondary ring.

Advantageously, a number of sending access nodes are connected to one and the same secondary ring, and the wavelengths dedicated to the sending nodes connected to one and the same secondary ring are contained in at least one predetermined waveband reserved for said secondary ring.

According to one particular embodiment, for each secondary ring, the insertion means for this secondary ring comprise:
- a waveband demultiplexer, for demultiplexing by band the optical signals of the core;
- means for selecting and transmitting wavebands carrying signals to be passed through, from amongst the bands demultiplexed by this multiplexer;
- means for selecting and eliminating at least one band from amongst the bands demultiplexed by this multiplexer, in order to extract, from the core fibre, information-carrying signals, in said reserved band;
- means for receiving, from the secondary ring, information-carrying signals, in said reserved band, and which are to be inserted into the core fibre, downstream of the means for selecting and eliminating a band;
- and a waveband multiplexer, for multiplexing, in the core fibre, said signals to be inserted and said signals to be passed through.

According to one particular embodiment:
- the means for selecting and eliminating at least one band from amongst the demultiplexed bands comprise an optical space switch per reserved band;
- the means for selecting and transmitting wavebands carrying signals to be passed through comprise an optical space switch per distinct band of said reserved band, and used for signals to be passed through;
- and the insertion means moreover comprise a number of variable optical attenuators, disposed respectively at the output of said switches.

Advantageously, an access node comprises means for sending and receiving information-carrying optical signals, which are all-optical, and capable of operating on at least one wavelength dedicated to said access node.

Advantageously, each access node is coupled to a secondary ring by means for extracting a representative signal, inserted in this secondary ring.

According to one particular embodiment, the network according to the invention moreover comprises a traffic concentrator for the management of so-called inter-network information sent from or to a backbone.

The metropolitan area network according to the invention thus manages both the inter-network traffic and the intra-network traffic. The traffic concentrator according to the invention, inserted in the fibre for example, simply allows the intra-network information to pass through transparently.

By way of illustration, a network according to the invention can comprise eight main nodes, each connected to a group of four sending and receiving access nodes. The four access nodes of each group send intra-network information-carrying signals at dedicated wavelengths in the transmission band reserved for the main node to which they are connected and can receive the intra-network information from the other thirty-one access nodes.

BRIEF DESCRIPTION OF THE DRAWINGS

In this configuration, multiplexed signals at thirty-two wavelengths are transported by the core fibre. Interleaving means can increase the transport capacity of this fibre.

Moreover, each intra-network information-carrying signal is for example modulated at 10 Gbit/s.

BRIEF DESCRIPTION OF THE DRAWINGS

The characteristics and objects of the present invention will emerge from the detailed description given below with reference to the accompanying sole figure, presented by way of illustration and in no way limitative.

DETAILED DESCRIPTION OF THE INVENTION

The figure shows one embodiment of an optical telecommunications network 1000, of metropolitan area type, according to the invention. It comprises a core, of ring type, comprising an optical fibre 10 for the transport, in a given direction of propagation (see arrow S), of wavelength multiplexed information-carrying optical signals.

Two main communication nodes 1, 2 are inserted in the fibre 10, as well as a traffic concentrator 110 for management of the so-called inter-network information sent from or to a backbone (not depicted).

The main node 1 is connected, via a first secondary ring comprising a connecting fibre 41 and two optical mixers 61, to two access nodes 11, 12 themselves connected to local networks (not depicted). Each access node 11, 12 sends and receives intra-network information, and comprises:
- means 111, 121 for sending information-carrying optical signals of dedicated wavelength $\lambda_1$, $\lambda_2$ which is contained in a first waveband reserved for said main node 1;
- means 112, 122 for receiving said intra-network information coming from any other access node whatsoever of the metropolitan area network 1000.

Similarly, the other main node 2 is connected, via a second secondary ring comprising a connecting fibre 43 and three optical mixers 63, connected to three access nodes 21, 22, 23 themselves connected to local networks (not depicted). Each access node 21 to 23 sends and receives information, and comprises:
- means 211, 221, 231 for sending information-carrying optical signals of dedicated wavelength $\lambda_3$, $\lambda_4$, $\lambda_5$ contained in a second waveband reserved for said other main node 2, distinct from the first band;
- means 212, 222, 232 for receiving said intra-network information coming from any other access node whatsoever of the network.

The main node 1 comprises, according to the direction of propagation in the core:
- a waveband demultiplexer 101a for demultiplexing, according to the first and second reserved bands, the intra-network information-carrying signals which have circulated in the core;
- two optical space switches, 10, 10' with two states (direct propagation mode, crossed propagation mode), placed in parallel, each being capable of receiving the demultiplexed signals with wavelengths in the first and second reserved bands respectively;
- two variable optical attenuators 100, 100' respectively disposed at the output of the first and second switches 10, 10';
- a waveband multiplexer 101b for multiplexing the signals sent by each of the attenuators 100, 100'.

The first optical space switch 10 comprises two branches 10a, 10b set in crossed propagation mode. The first branch 10a is used to divert outside the core the demultiplexed signals in the first reserved band. The second branch 10b is used to insert into the core the signals in the first band originating from the access nodes 11, 12 without mixing them with the diverted demultiplexed signals.

The second optical space switch 10' is set in parallel propagation mode in order to pass through the optical signals it receives from the demultiplexer 101a.

The other main node 2 has operating means similar to those of the main node 1:
- a waveband demultiplexer 201a;
- an optical space switch 20 with two branches 20a, 20b in crossed propagation mode;
- an optical space switch 20', in parallel propagation mode;
- two variable optical attenuators (not depicted);
- a waveband multiplexer 201b.

Furthermore, two optical amplifiers 51, 52, for example erbium-doped fibre amplifiers, have two stages 51a to 52b inserted in the core fibre 10 respectively either side of the main node 1 and either side of the other main node 2.

Means of all-optical transmission, at dedicated wavelengths, of so-called intra-network information between sending and receiving access nodes comprise:
- the mixers 61, 63 and the insertion means 10a, 20a;
- means 31, 32 for taking a representative signal formed of a fraction of the power of each intra-network information-carrying multiplexed signal;
- means 621, 622, 641 to 643 for extracting a fraction of the power of the representative signal;
- means 113 to 233 for selecting the intra-network information;
- the diverting means 10a, 20a.

The taking means 31, 32, of optical power coupler type, are inserted in the core fibre 10 respectively upstream of the main node 1 and upstream of the other main node 2, with respect to said direction of propagation in the core.

Thus, unlike the prior art, the taking of a signal carrying intra-network information intended for an access node is carried out not by the insertion/extraction means of the main node connected to this receiving access node but upstream of this main node with respect to the direction of propagation in the core: the network according to the invention is asymmetric with respect to the optical space switches.

The two access nodes 11, 12 are connected to the means 31 via an interconnecting fibre 42 of the first secondary ring in which there are inserted two means 621, 622 for extracting a fraction of the power of the representative signal.

Each of the extraction means 621, 622 is capable of sending the extracted signal to a wavelength-tunable optical filter 113, 123 of the receiving node 11, 12. The filters 113, 123 select from the extracted signals the intra-network information intended for the receiving means 112, 122.

In the same way, the three access nodes 21, 22, 23 are connected to the means 32 via an interconnecting fibre 44 of the second secondary ring in which there are inserted three means 641 to 643 for extracting a fraction of the power of the representative signal. And, similarly, each of the extraction means 641 to 643 is capable of sending the extracted signal to a wavelength-tunable optical filter 213, 223, 233 of the receiving node 21, 22, 23, each filter sending the selected intra-network information to the receiving means 212, 222, 232.

The all-optical transmission of intra-network information is depicted by means of the path of the intranetwork information $I_{11}, I_{12}, I_{21}, I_{22}, I_{23}$ respectively carried by modulated optical signals of dedicated wavelengths $\lambda_1$ to $\lambda_5$ sent by the sending means 111, 121, 211, 221, 231 and received by the receiving means 112, 122, 212, 222, 232.

Of course, the preceding description has been given purely by way of illustration. Without departing from the scope of the invention, any means can be replaced by an equivalent means.

A number of wavelengths, perhaps even a waveband, can be dedicated to a sending access node according to the invention so that for example two bands can be reserved for the same main node such as the node 1. In one configuration (not depicted), a second connecting fibre comprising mixers is used and connected to a second space switch in crossed propagation setting. In another configuration (not depicted), the connecting fibre 41 opens into a waveband optical demultiplexer with two outputs, one connected to the space switch and the other to a second similar space switch.

What is claimed is:

1. An optical telecommunications network, of metropolitan area type, comprising:
   a ring type core comprising at least one optical fibre for the transport, in a given direction of propagation, of information-carrying optical signals;
   secondary rings, each secondary ring being connected to the core by a corresponding signal insertion means and a corresponding signal extraction means, these means being inserted in the core fibre;
   at least one first sending access node, connected to the core via a secondary ring and the corresponding insertion means, this sending access node comprising means for sending information-carrying optical signals;
   at least one second destination access node, connected to the core via a secondary ring and the corresponding extraction means, this destination access node comprising means for receiving information-carrying optical signals;
   wherein:
   in each sending access node, the means for sending information-carrying optical signals use a wavelength belonging to a group of wavelengths dedicated to the secondary ring to which this sending access node is connected;
   in each destination access node, the receiving means are capable of receiving all the wavelengths used by sending nodes of the network;
   the insertion means comprise all-optical means for inserting, into the core fibre, optical signals sent by each sending access node connected to the corresponding secondary ring;
   and the extraction means comprise optical couplers for taking from the core fibre a representative signal formed of a fraction of the power of each information-carrying signal, these couplers being respectively coupled to said receiving means, of the destination nodes,
   the network further comprising a number of sending access nodes connected to a same secondary ring, wherein the wavelengths dedicated to the sending nodes connected to the same secondary ring are contained in at least one predetermined waveband reserved for said same secondary ring.

2. An optical telecommunications network according to claim 1, wherein for each secondary ring, the insertion means for this secondary ring comprise:
   a waveband demultiplexer, for demultiplexing by band the optical signals of the core;
   means for selecting and transmitting wavebands carrying signals to be passed through, from amongst the bands demultiplexed this multiplexer;
   means for selecting and eliminating at least one band from amongst the bands demultiplexed by this multiplexer, in order to extract, from the core fibre, information-carrying signals, in said reserved band;
   means for receiving, from the secondary ring, information-carrying signals, in said reserved band, and which are to be inserted into the core fibre downstream of the means for selecting and eliminating a band;

and a waveband multiplexer, for multiplexing, in the core fibre, said signals to be inserted and said signals to be passed through.

3. An optical telecommunications network according to claim 2, wherein the means for selecting and eliminating at least one band from amongst the demultiplexed bands comprise an optical space switch per reserved band;

wherein the means for selecting and transmitting wavebands carrying signals to be passed through comprise an optical space switch per distinct band of said reserved band, and used for signals to be passed through; and wherein the insertion means moreover comprise a number of variable optical attenuators, disposed respectively at the output of said switches.

4. An optical telecommunications network according to claim 1, wherein an access node comprises means for sending and receiving information-carrying optical signals, which are all-optical, and capable of operating on at least one wavelength dedicated to said access node.

5. An optical telecommunications network according to claim 1, wherein, in an access node, the means for receiving information-carrying optical signals comprise means for selecting the received wavelengths.

6. An optical telecommunications network according to claim 5, wherein these selection means are wavelength-tunable.

7. An optical telecommunications network according to claim 1, wherein each access node is coupled to a secondary ring by means for extracting a representative signal, inserted in this secondary ring.

8. An optical telecommunications network according to claim 1, further comprises a traffic concentrator for the management of so-called inter-network information sent from or to a backbone.

9. The optical telecommunication network according to claim 1, wherein, the extraction means is provided in the core fibre at a position that is upstream from a position of the insertion means in a direction of propagation in the core.

* * * * *